United States Patent [19]

Kobayashi

[11] 4,444,482

[45] Apr. 24, 1984

[54] FILM DETECTING DEVICE IN AUTOMATIC FILM WINDING TYPE CAMERA

[75] Inventor: Takumi Kobayashi, Tokyo, Japan

[73] Assignee: Asahi Kogaku Kogyo Kabushiki Kaisha, Tokyo, Japan

[21] Appl. No.: 316,152

[22] Filed: Oct. 28, 1981

[30] Foreign Application Priority Data

Oct. 31, 1980 [JP] Japan ................... 55-155719[U]

[51] Int. Cl.³ .............................................. G03B 1/00
[52] U.S. Cl. ................................. 354/173.1; 354/212
[58] Field of Search .............. 354/21, 171, 173, 212, 354/214, 213, 217, 218; 352/92, 170, 171, 174

[56] References Cited

U.S. PATENT DOCUMENTS

| | | | |
|---|---|---|---|
| 3,205,507 | 9/1965 | Hochstein | 352/171 |
| 3,598,033 | 8/1971 | Sasaki | 354/214 |
| 3,878,546 | 4/1975 | Adamski | 354/173 |
| 4,171,893 | 10/1979 | Kawazoe | 354/173 |
| 4,196,993 | 4/1980 | Stemme et al. | 354/213 |

FOREIGN PATENT DOCUMENTS 1156639 10/1963 Fed. Rep. of Germany ...... 354/173

Primary Examiner—A. A. Mathews
Attorney, Agent, or Firm—Sughrue, Mion, Zinn, Macpeak & Seas

[57] ABSTRACT

A camera device for controlling a motor-driven, automatic film winder which winds unexposed film in a camera includes first and second electrical contacts disposed on opposite sides of a film path for detecting the absence of film in the film path. The contacts are connected to a motor drive circuit for the automatic film winder so that the automatic film winder is disabled when the absence of film is detected. The first contact is disposed in an aperture in a film pressure plate, and the film pressure plate is urged towards a rear camera portion by a spring.

4 Claims, 2 Drawing Figures

FILM DETECTING DEVICE IN AUTOMATIC FILM WINDING TYPE CAMERA

BACKGROUND OF THE INVENTION

This invention relates to a film detecting device in a camera with a motor driven automatic film winder adapted to wind a film having no end stop.

When a film in a camera of this type has been wound up, the drive motor continues to run, and it is usually necessary to manually turn off the power switch. Alternatively, a film detecting member may be provided in the film passage, the film detector being operated when the film has been wound up, so as to open the switch of a drive motor circuit and thereby automatically stop the drive motor.

The former method is not satisfactory to the camera operator, because the motor is continuously run until the power switch is turned off, thus uneconomically consuming the available battery power. This difficulty has been overcome by the latter method, but the latter method is also disadvantageous in that, when the switch is erroneously operated, the winding operation is stopped although the film has not been wound to the end yet, and accordingly the operator may open the cover of the film chamber thinking that the film has been wound up, thus spoiling the film. At the very least, the film may be wound unsatisfactorily.

SUMMARY OF THE INVENTION

This invention is intended to eliminate the above-described difficulties merely by providing simple members.

According to this invention, simple contact members are provided along the film path to confront one another through the film. As long as there is film in the film path, the contact members are electrically isolated and the automatic winder is operative in its normal manner, including winding up the film after the last frame has been exposed. When the film is fully wound up, there will be no film between the contact pieces and they will contact one another to deenergize the automatic winder automatically.

BRIEF DESCRIPTION OF THE DRAWINGS

One example of a film detecting device according to this invention will be described with reference to the accompanying drawings, in which.

DESCRIPTION OF THE PREFERRED EMBODIMENTS

Figure 1:
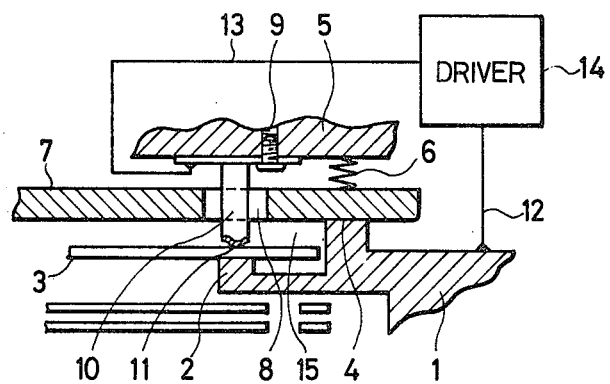
FIG. 1 is sectional view showing one example of a film detecting device according to this invention when a film is provided in a tunnel.

As shown in FIG. 1, film supporting surfaces 2 protruded like banks are formed on an electrically conductive camera body 1 at positions corresponding to both edges of a picture frame in the running direction of the film, and film-pressure plate supporting surfaces 4 protruded like banks are also formed on the camera body 1 outside both edges of a film 3. Springs 6 are interposed between a film pressure plate 7 and a rear structure 5, so as to press the film pressure plate 7 against the film-pressure-plate supporting surfaces 4. Thus, the film pressure plate 7 and the supporting surfaces 2 and 4 form a passage, or "tunnel" 15, for the film 3. The film pressure plate 7 has a through-hole 8.

An electrically conductive contact piece 10 is secured to the rear structure 5 with screws 9 at one end, and has an elastic contact 11 at the other end. The contact piece 10 is extended through the through-hole 8 to be in contact with the film supporting surface 2, so that the contact piece 10 serves as a switch for a circuit which controls a motor circuit according to the presence or absence of film. In order to increase the degree of flatness of the film supporting surfaces 2, the latter are machined after the camera body has been subjected to surface treatment. The film supporting surface 2 is exposed to improve its electrical conductivity. A lead 12 from the camera body 1, and a lead 13 from the contact piece 10 are connected to an automatic film winder driver circuit 14 which controls the winding system of the camera.

Figure 2:
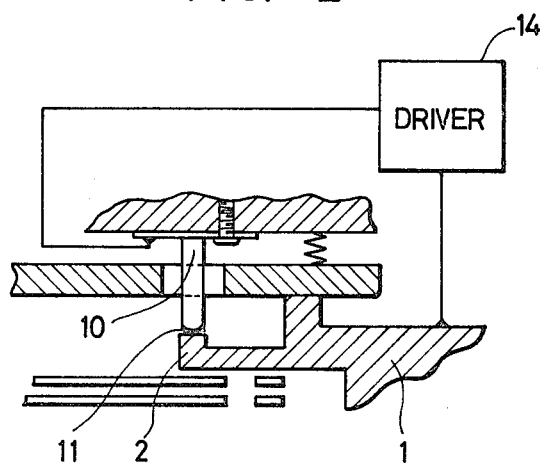
FIG. 2 is sectional view showing the film detecting device of this invention when no film is in the tunnel.

When the film 3 is in the tunnel 15, the film 3 is interposed between the film supporting surface 2 and the contact piece 10, so that the latter 10 is electrically disconnected from the film supporting surface and the switch is opened. As a result, the drive circuit 14 is activated to perform the film winding operation. If, in this operation, the number of remaining frames of the film 3 is sufficient to permit a photographing operation, each frame is controlled by a film frame indexing mechanism (not shown) as is known in the art, and after the last frame has been used for photographing, a continuous film winding operation is carried out. After the film has been wound up, there is no film in the tunnel 15 as shown in FIG. 2. Therefore, the contact 11 is brought into contact with the film supporting surface 2 and the switch is closed, so as to stop the operation of the automatic film winder drive circuit 14.

As is apparent from the above description, according to this invention, the provision of the simple contact and support members makes it possible to automatically stop the drive motor as soon as the film has been wound up, which improves the operability and is effective in increasing the service life of the battery. In addition to this, the film detecting device for a camera having an automatic film winder according to this invention is advantageous in that, even if the switching means becomes defective in contact, this fault affects the operation only when the film has been fully wound up, and winding of the frames is correctly carried out throughout the photographing operation.

What is claimed is:

1. In a camera having an electrically operated camera mechanism, said camera having film transported along a film path, the improvement comprising:

film detecting means for detecting the presence of said film in said film path and for disabling said camera mechanism when no film is detected, said film detecting means comprising: first and second electrical contacts disposed in opposite sides of said film path, said film passing between said contacts to isolate them from one another when said film is in said film path;

a film pressure plate having an aperture therein;

a rear camera portion on which said first contact is mounted, said first contact extending through said aperture;

means for urging said pressure plate toward said film path from said rear camera portion; and said second contact comprising an electrically conductive camera body portion.

2. The improvement as claimed in claim 1, wherein said camera mechanism is an automatic winding device.

3. A device for a camera, the device controlling a motor-driven, automatic film winder which winds unexposed film in a camera, comprising:

means for forming a film path;

film detecting means for detecting the absence of said film in said film path, said film detecting means comprising first and second electrical contacts disposed in opposite sides of said film path, said film passing between said contacts to isolate them from one another when said film is in said film path, a film pressure plate having an aperture therein, a rear camera portion on which said first contact is mounted, said first contact extending through said aperture, means for urging said pressure plate toward said film path from said rear camera portion, and said second contact comprising an electrically conductive camera body portion;

a motor drive circuit which activates said film winder to advance said film subsequent to a film exposure, said motor drive circuit including a switch which disables said automatic film winder when closed, said switch being closed by said film detecting means when an absence of said film is detected in said film path;

whereby when an end of said unexposed film is reached after all of said film has been exposed, said film detecting means detects an absence of said film and closes said switch in said motor drive circuit which disables said automatic film winder.

4. The device as claimed in claim 3 further comprising means for biasing said first and second contacts toward one another and means for connecting said first and second electrical contacts with said motor drive circuit, said biasing means causing said first and second contacts to contact each other when said end of said film is reached after all of said film has been exposed which closes said switch and disables said automatic film winder.

* * * * *